Nov. 2, 1965 L. J. KAMM 3,215,235
FLUID ACTUATED SERVO CLUTCH
Filed June 11, 1962 2 Sheets-Sheet 1
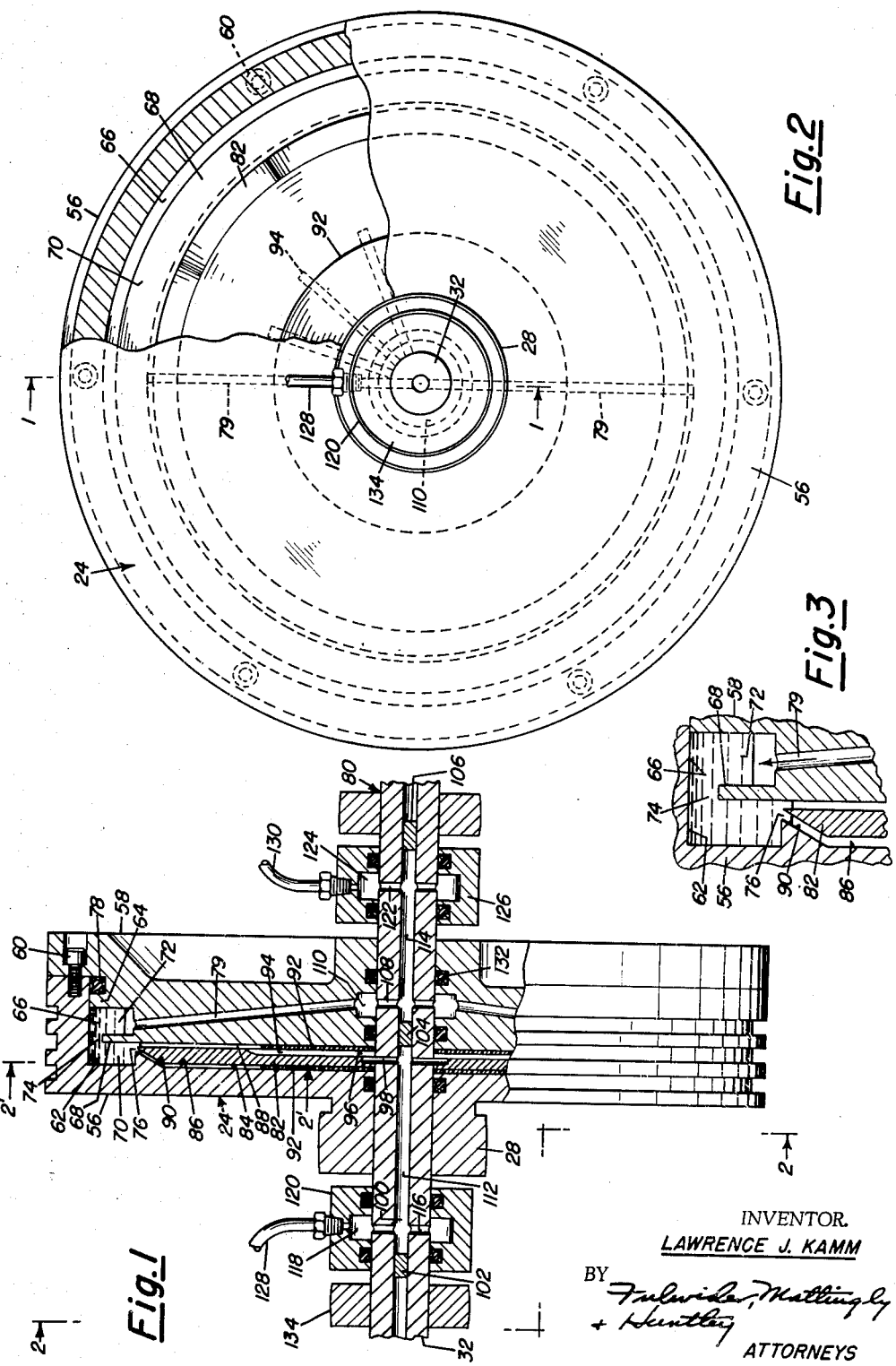
INVENTOR.
LAWRENCE J. KAMM
BY
ATTORNEYS Nov. 2, 1965   L. J. KAMM   3,215,235
FLUID ACTUATED SERVO CLUTCH
Filed June 11, 1962  2 Sheets-Sheet 2

INVENTOR.
LAWRENCE J. KAMM
BY Fulwider, Mattingly
+ Huntley
ATTORNEYS

# United States Patent Office 3,215,235
Patented Nov. 2, 1965

3,215,235
FLUID ACTUATED SERVO CLUTCH
Lawrence J. Kamm, San Diego, Calif., assignor to Numerical Control Corporation, San Diego, Calif., a corporation of California
Filed June 11, 1962, Ser. No. 201,455
14 Claims. (Cl. 192—58)

The present invention relates to clutches of the type used in controllable coupling between the power input and the power output, such as those used in servomechanisms and regulators. More particularly, the invention relates to clutches for servomechanisms and regulators using a fluid, such as air or gas as the control medium.

In one aspect of the invention, the clutch includes a driving rotor, in the form of a shell, which is adapted to be rotated by a source of power. This rotor is provided with a chamber having an annular opening concentric with the axis of the rotor and is herein, at times, referred to as a "drag chamber." This chamber contains a liquid, such as oil, which is centrifugalized during the rotation of the rotor.

The clutch also includes a driven or power take-off rotor. It extends into the liquid in the driving rotor and consequently viscous drag is established between the liquid and the power take-off rotor.

In the broad aspect of the invention, the drag is varied by varying the areas of the take-off rotor engaged by the liquid. A source of extraneous pressure, for example pneumatic pressure, is used for varying the areas of the take-off rotor engaged by the liquid.

Specifically, such variation can be effected by any suitable means for shifting either the take-off or the liquid radially with respect to one another.

In one aspect of the invention, the clutch includes a rotor which is provided with at least two chambers. One of these chambers, herein termed a "drag chamber," is connected by a passageway to a second or "reference chamber." These chambers contain a liquid, such as oil, and this liquid can pass freely from one chamber to the other.

The liquid in these chambers is subjected, independently, to fluid pressure from two separate extraneous sources. Variation in the pressures in those sources causes partial displacement, i.e., shifting of the liquid between the chambers.

The second rotor extends radially into the liquid in the drag chamber whereby viscous drag is established between the two rotors. The value of this drag is varied by varying the areas covered by the liquid, and these areas are controlled by varying the liquid level in the drag chamber.

A third chamber is provided in another aspect of the invention. This third chamber contains a pump for maintaining a constant level of liquid in the reference chamber, while the clutch is in operation, although liquid is being fed to or liquid is being removed from the drag chamber.

Two clutches are provided when it is desirable to effect movement of the output in either a clockwise direction or a counterclockwise direction. Each clutch includes a shell forming a drag chamber and a take-off rotor. The shells are rotated at a constant speed in opposite directions and preferably at the same r.p.m.

The axles or the shafts of take-off rotors extend through and axially of the driving rotor, respectively, and are arranged parallelly of one another. These axles or shafts are mechanically connected with one another for concurrent rotation. The power take-off may be from either or both of the shafts.

A source of extraneous fluid pressure is connected to the drag chamber of one of the shells and is also connected with the reference chamber of the other shell. Likewise a second source of extraneous fluid pressure is connected with the reference chamber of the said one shell and is also connected with the drag chamber of the said other shell.

Other features and the advantages will be apparent from the following description, reference being had to the accompanying drawings wherein the preferred embodiments of the invention are illustrated.

In the drawings:

FIG. 1 is a view partly in section showing one form of clutch, the section being taken substantially along line 1—1 of FIG. 2;

FIG. 2 is a view looking in the direction of arrow 2 of FIG. 1, parts thereof being shown in section, the section being taken substantially along line 2'—2' of FIG. 1;

FIG. 3 is a fragmentary sectional view showing an enlarged portion of the upper part of the clutch shown in FIG. 1;

Figure 5:
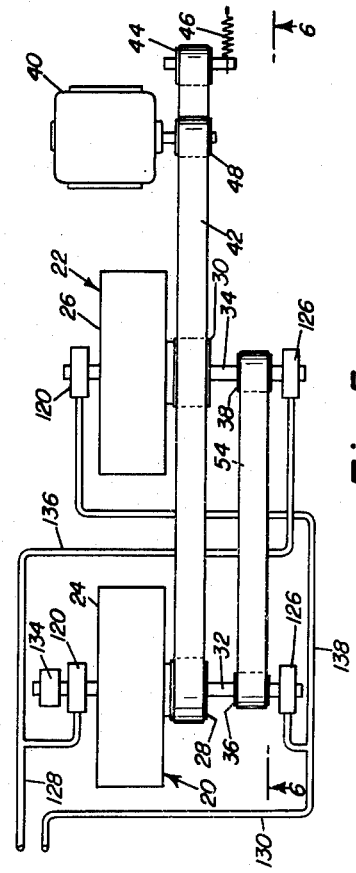
FIG. 5 is a top plan view of the combination clutch assembly.
Figure 6:
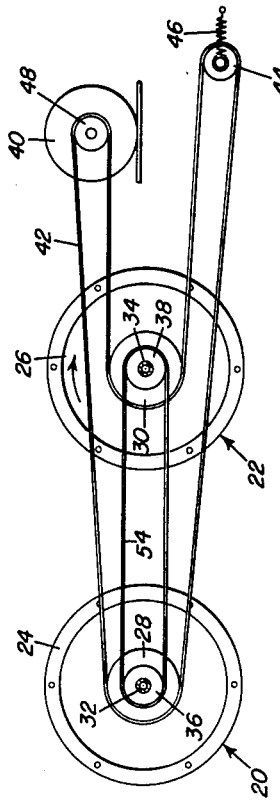
FIG. 6 is a view looking in the direction of arrow 6—6 of FIG. 5.

Referring more in detail to the drawings and particularly to FIGS. 5 and 6, the combination clutch assembly therein shown includes two clutches 20 and 22. The clutch 20 includes a rotor in the form of a shell 24 and the clutch 22 includes a rotor in the form of a shell 26. The rotor 24 includes a pulley 28 and the rotor 26 includes a pulley 30. The rotors 24 and 26 are rotatably carried by parallelly disposed axles 32 and 34, respectively, and these axles, in the form of hollow shafts, have pulleys 36 and 38, respectively, fixed thereto.

The rotors 24 and 26 are rotated in opposite directions. For example, the rotor 24 is rotated in a counterclockwise direction and the rotor 26 is rotated in a clockwise direction. The rotors are rotated through a motor 40 and belt 42. This belt is laced about the pulley 28, over an idler pulley 44 then over the pulley 30. The belt is maintained taut through the idler pulley and a spring 46. Thus it will be seen that counterclockwise rotation of the pulley 48 of the motor 40 will cause counterclockwise rotation of the rotor 24 and clockwise rotation of the rotor 26.

The pulleys 36 and 38 of shafts 32 and 34 are connected mechanically with one another through a belt 54.

Referring now particularly to FIGS. 1, 2 and 3, one form of clutch is shown, as for example, clutch 20. The shaft or axle 32 is carried by bearings (not shown) and provides an axle for the rotor 24. This rotor is formed, for example, of two castings 56 and 58 which are secured to one another by screws 60. The pulley 28 is formed integrally with casting 56. The casting 56 is recessed as at 62 and a portion 64 of casting 58 extends part way into this recess to form an annularly shaped chamber 66. The casting 58 includes a circularly shaped flange 68 which extends radially into the chamber 66, but stops short of the outer periphery of the chamber 66 to divide chamber 66 into an annularly shaped sub-chamber 70 and an annularly shaped sub-chamber 72 which are connected by a passageway 74. In this manner the outer portion of the sub-chambers are permanently interconnected with one another. The sub-chamber 70 is provided with an annular opening 76 which is concentric with the axis of the rotor. The joint between the castings 56 and 58 is sealed by a circular ring 78.

The sub-chamber 70 will be hereinafter, at times, referred to as a "drag chamber" and the sub-chamber 72 will be hereinafter, at times, referred to as a "reference chamber."

The shell 24, including the castings 56 and 58, is herein referred to, at times, as a "driving rotor." The reference chamber 72 is connected with one or more ducts 79 formed in the casting 58. The chambers 70 and 72 contain a quantity of liquid such as oil, and fluid pressure can be applied to the oil in reference chamber 72 through the duct 79 to cause displacement or shifting of the oil from chamber 72 to chamber 70. Pressures can be applied to the oil in drag chamber 70 as well as in reference chamber 72 for the purpose of controlling the flow of oil through the annular opening 76 in chamber 70. How these pressures are applied and the reasons therefor will be apparent from the description to follow.

Each clutch includes a second or "driven rotor" 80; the main elements of which include the shaft 32 and a member fixed thereto in the form of a disc 82. The disc 82 extends radially of the shaft and into a disc compartment 84 formed by radially recessing casting 56 as at 86, thus forming a wall for the compartment. The opposite wall 88 of the compartment is formed by a side wall of casting 58. The periphery of compartment 84 is in open communication with the annular opening 76 of compartment 70.

The outer portion 90 of wall 86 is tapered outwardly and toward the wall 88 of casting 58, and the outer portion of disc 82, which is adjacent the tapered portion 90, is tapered conformingly to prevent discontinuity in drag between the disc and the oil contacting the disc.

Suitable washers 92 are disposed on opposite sides of the disc 82.

The disc 82 is fluted and the flutes 94 lead from a chamber 96 in the disc, which chamber registers with a transversely disposed hole 98 in the shaft, and the upper ends of the flutes 94 lead to the compartment 84 beyond washer 92.

Shaft 32 is provided with a longitudinally extending hole 100, which hole is plugged by plugs 102, 104 and 106. Plugs 102 and 106 are disposed adjacent opposite ends of the shaft 32 and plug 104 is disposed to the right of transverse hole or holes 98 and to the left of a second transverse hole or holes 108. Transverse holes 108 lead to an annular chamber 110 in casting 58, which chamber is connected with the ducts 79 leading to the reference chamber 72. Thus the plug 104, in conjunction with plug 102, divides the hole 100 into a chamber 112, and, in conjunction with plug 106, divides the hole 100 into a chamber 114.

Transverse holes 116 in shaft 32 connect shaft chamber 112 with a chamber 118 in a stationary bushing 120, and transverse holes 122 connect shaft chamber 114 with a chamber 124 in a stationary bushing 126. These bushings are held stationary in any suitable manner and their chambers are connected, respectively, with tubes 128 and 130. These tubes lead from the mechanism or apparatus which is to be controlled and are subjected, independently, to variations in pressures. Suitable rubber rings 132 are provided for sealing the rotatable shaft 32 with respect to the stationary bushings 120, 126 and the rotor 24.

It will be understood from the foregoing that upon rotation of the rotor 24, the liquid therein is centrifugalized into an annulus. An increase in pressure in tube 130 or decrease in pressure in tube 128 will effect shifting of liquid from reference chamber 72 to the drag chamber 70 and into compartment 84 causing increased viscous drag on the bevel of the disc 82 to increase the power applied to the rotor 80. The reverse occurs when the pressure in tube 130 decreases or the pressure in tube 128 increases. Thus the output power of the rotor can be varied from nil to the full drag effect of the liquid on the bevel of disc 82. Power can be taken from the shaft 32 of rotor 80 by, for example, a pulley 134.

When it is desirable to provide for rotating shaft 32 in either direction, two clutches are provided, one of which will cause shaft 32 to rotate in a direction opposite to that caused by rotor 24. Therefore, rotor 26 is provided. Its shaft 34 is connected by pulley 38 and belt 54 to the pulley 36 of rotor 24. As shown in FIG. 5, the tube 128, which is connected to compartment 84 of rotor 24, is connected also to the compartment 124 of bushing 126 of rotor 26 by a tube 136. And the tube 130, which is connected to the ducts 79 leading to reference chamber 72 of rotor 24, is connected to chamber 118 of bushing 120 of rotor 26 by a tube 138.

Thus, for example, when there is an increase in pressure in reference chamber 72 of rotor 24 there will also be an increase in pressure in the drag chamber 70 of rotor 26. In other words, the pressure in drag chamber 70 of rotor 24 and the pressure in reference chamber 72 of rotor 26 will always correspond, and the pressure in drag chamber 72 of rotor 24 and the pressure in reference chamber 70 of rotor 26 will always correspond. When the equilibrium of pressure in tubes 128 and 130 is disturbed, the driven rotor 80 will be rotated either clockwise or counterclockwise, and the power exerted will depend upon the degree of differential in pressure in tubes 128 and 130.

The priming of the clutches of the type shown in FIGS. 1, 2 and 3 is critical since the amount of liquid is critical. If too much oil is introduced into the rotor 24, it will at least partially fill compartment 84 and power will be needlessly dissipated. Conversely, if not enough liquid is introduced into the rotor, the clutch will have an inactive or dead zone, i.e., a certain appreciable pressure differential must be attained before any torque is generated. This difficulty is overcome by the type of clutch shown in FIG. 4.

Figure 4:
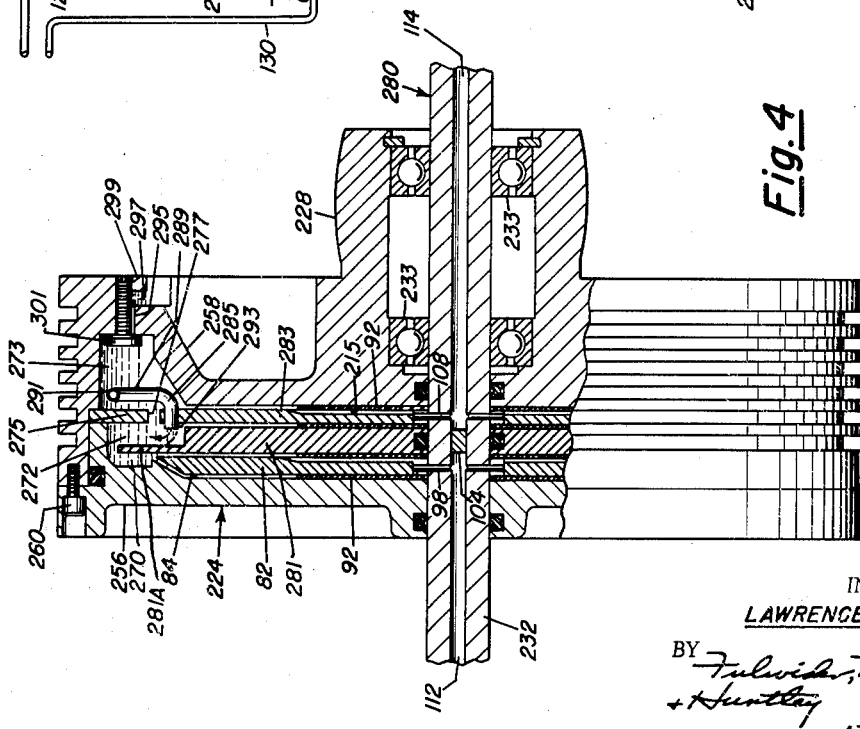
FIG. 4 is a view partly in section of another aspect of the invention, partly in section, the section being taken substantially in the same manner as in FIG. 1.

Referring now to the aspect of the invention shown in FIG. 4, a rotor 224 is formed of two castings, 256 and 258, which are secured to one another by screws 260. This rotor is journalled on a shaft 232 through ball bearings 233. The casting 258 is provided with an integrally formed pulley 228. In this embodiment the driven rotor 280, in addition to including the disc 82, also includes a second disc 283. This disc carries pumps in the form of bent tubes, one of which is shown including a radially extending portion 289 which merges into a forwardly extending portion 291 which forms the inlet to the tube. The outlet end 293 of the tube empties into the reference chamber 272.

A third, idler disc 281 is mounted on rotor 280 between the discs 82 and 283. This idler disc is free to rotate with or relative to the rotor and has an annular peripheral extension 281A separating the drag chamber 270 for disc 82 from the reference chamber 272. In this embodiment, in addition to the drag chamber 270 and reference chamber 272, a third annularly shaped chamber 273 is provided and is formed by the casting 258 and an annular, inwardly directed weir 275.

The transverse holes 108 leading from the chamber 114 are connected with flutes 215 in disc 283. In this manner the oil in chambers 272 and 273 is subjected to the pressure in tube 130 leading to chamber 114, as before. On rotation of the rotor 224, oil will be forced radially inwardly through the tube 289 and into the reference chamber 272, since the opening in the end of the portion 291 faces forwardly and into the centrifugalized oil. The oil will overflow the inner edge 277 of the weir 275. Sufficient oil will be delivered by the pump to the reference chamber 272 so that the oil level is always maintained at the inner circularly shaped edge 277 of the weir. Thus a constant head of oil is maintained in the reference chamber 272.

The exact quantity of oil that is contained in the rotor 224 is controlled through the amount of oil that can be placed in rotor 224. A duct 295 is connected with the chamber 273 which duct in turn is connected with an external groove 297 which is formed by an external weir 299. A closure member 301 may be screwed inwardly to open the duct 295 or may be screwed outwardly to close the duct.

To charge the rotor with oil, the rotor 224 is rotated to centrifugalize the oil into operating distribution. Oil is then added to the groove 297 and flows into the reservoir or chamber 273. When this oil reaches the inner edge of weir 299, the loading is completed as desired. The rotor is then stopped and the closure member 301 is moved to seal the duct 295.

Operation of the specie shown in FIG. 4 differs from FIGS. 1, 2 and 3 in one respect. In FIG. 1 differential pressure is balanced by the differential oil level and this oil level is established by a change in level in both chambers (70, 84) and 72. In the specie shown in FIG. 4, a differential pressure is again balanced by a differential oil level, but the entire differential is established in the chamber (270, 84) since the level in the reference chamber 272 is maintained constant by the pump or pumps 285 and the weir 275.

The response function of a single clutch or pair of clutches, as in FIG. 1, is approximately linear with applied pressure differential if the clearances in chamber 84, between the disc 82 and the walls defining the chamber 84, are maintained uniform, the edges of the driven discs 82 are beveled, and the oil level corresponding to zero pressure differential is at the periphery of the bevel. It will, of course, be understood that nonlinear functions of torque versus pressure may be achieved by changing these conditions.

Too, it will be understood that when it is desirable to rotate shaft 232 in either of two directions, a second rotor like rotor 224 will be employed and the two rotors will be connected as is shown in FIGS. 5 and 6.

Thus it is apparent from the foregoing that there has been provided a clutch which is responsive to minute changes in extraneous pressure, and also by the present invention, the driven element to be controlled can be moved in either of two directions in response to minute changes or differential in extraneous sources of pressures.

While the forms of embodiments herein shown and described constitute preferred forms, it is to be understood that other forms may be adopted falling within the scope of the claims that follow.

I claim:
1. A clutch comprising, in combination:
(A) Means including a first rotor adapted to be rotated by a source of power,
  (a) said rotor forming a first chamber and a second chamber,
  (b) and having a passageway inter-connecting said chambers,
  (c) a driving liquid in said chambers and passageway,
  (d) said means forming a duct connected with the first chamber and forming a duct connected with the second chamber,
  (e) said ducts being connected, respectively, to independent sources of pressures for causing displacement of liquid between said chambers upon variation of differential of pressures in said ducts;
(B) and a second rotor extending into the first mentioned chamber a sufficient distance to be subjected to the liquid in said first chamber to be driven thereby.

2. A clutch as defined in claim 1, in which portions of the ducts are formed in the first and second mentioned rotors.

3. A clutch as defined in claim 1, including a shaft rigidly secured to said second rotor and forming an axle for said first rotor, a portion of the shaft being hollow and the hollow forming portions of the ducts.

4. A clutch as defined in claim 1, in which portions of the ducts are formed in the first and second mentioned rotors, a shaft rigidly secured to one of said rotors and forming an axle for the other rotor, a portion of the shaft being hollow and the hollow forming portions of the ducts.

5. A clutch comprising, in combination:
(A) Means including a first rotor adapted to be rotated by a source of power,
  (a) said means forming a first chamber, a second chamber and a third chamber in said rotor,
  (b) said rotor having a radially inwardly extending weir spaced laterally of the first mentioned chamber and forming a wall for the second chamber and a wall for the third chamber,
  (c) said rotor forming a passageway inter-connecting the first and second chambers,
  (d) said means forming a duct connected with the first chamber and forming a duct connected with the second and third chambers,
  (e) a driving liquid in said chambers and passageway,
  (f) said ducts being connected, respectively, to independent sources of pressures for causing displacement of liquid between said chambers upon variation of differential of pressures in said ducts;
(B) and a second rotor having:
  (g) a member extending into the first mentioned chamber a sufficient distance to be subjected to the liquid in said chamber,
  (h) and a pump having an intake extending into the liquid in the third mentioned chamber and having an outlet leading to the second mentioned chamber.

6. A clutch comprising in combination:
(A) means including a rotor adapted to be rotated by a source of power,
  (a) said rotor forming a chamber having an annular opening concentric with the axis of the rotor,
  (b) a driving liquid in said chamber;
(B) a second rotor extending into the chamber a sufficient distance to be subjected to the liquid therein;
(C) and means effecting radial variations in contact areas between the second rotor and the liquid including:
  (c) a duct connected with one of said rotors and connected with a source of extraneous fluid which is subjective to variation in pressures to increase said contact areas upon increase in pressure,
  (d) a portion of said duct being formed in the first mentioned rotor.

7. A clutch comprising in combination:
(A) means including a rotor adapted to be rotated by a source of power,
  (a) said rotor forming a chamber having an annular opening concentric with the axis of the rotor,
  (b) a driving liquid in said chamber;
(B) a second rotor extending into the chamber a sufficient distance to be subjected to the liquid therein;
(C) and means effecting radial variations in contact areas between the second rotor and the liquid including:
  (c) a duct connected with one of said rotors and connected with a source of extraneous fluid which is subjective to variation in pressures,
  (d) a portion of said duct being formed in and extending radially of the second mentioned rotor.

8. A clutch comprising, in combination:
(A) means including a rotor adapted to be rotated by a source of power,
  (a) said rotor forming a chamber having an annular opening concentric with the axis of the rotor,
   (b) a driving fluid in said chamber;
(B) a second rotor extending into the chamber a sufficient distance to be subjected to the liquid therein,
   (c) said second mentioned rotor including a hollow shaft;
(C) and means effecting radial variations in contact areas between the second rotor and the liquid including:
   (d) a duct formed in said first mentioned rotor and connected with a source of extraneous fluid which is subjective to variation in pressures to increase said contact areas upon increase in pressure,
   (e) the hollow of the shaft forming a portion of said duct.

9. A clutch comprising in combination:
(A) means including a rotor adapted to be rotated by a source of power,
   (a) said rotor forming a chamber having an annular opening concentric with the axis of the rotor,
   (b) a driving liquid in said chamber;
(B) a second rotor extending into the chamber a sufficient distance to be subjected to the liquid therein,
   (c) said second rotor including a disc, the outer portion of which tapers to a lesser width radially,
   (d) and the wall defining said chamber tapering adjacent said rotor taper in substantially parallel relation thereto;
(C) and means effecting radial variations in control areas between the second rotor and the liquid including:
   (e) a duct connected with one of said rotors and connected with a source of extraneous fluid which is subjective to variation in pressures.

10. A clutch comprising in combination:
(A) means including a rotor adapted to be rotated by a source of power,
   (a) said rotor forming a chamber having an annular opening concentric with the axis of the rotor,
   (b) a driving fluid in said chamber;
(B) a second rotor extending into the chamber a sufficient distance to be subjected to the liquid therein;
(C) and means effecting radial variations in contact areas between the second rotor and the liquid without changing the amount of liquid in said rotor including:
   (c) a duct formed in and rotating with said first mentioned rotor and connected with a source of pneumatic pressure which is subjective to variation to move the radial level of said liquid inwardly of said chamber upon increase in pressure.

11. A clutch comprising, in combination:
(A) means including a rotor adapted to be rotated by a source of power,
   (a) said rotor forming a chamber having an annular opening concentric with the axis of the rotor,
   (b) a driving liquid in said chamber;
(B) means for shifting the liquid radially within said chamber while said liquid is being centrifugalized by rotation of said rotor,
   (c) said last mentioned means including a duct formed and rotating with said rotor and associated with said liquid,
   (d) and a source of pneumatic pressure connected to said duct and subjected to variations in pressure extraneous to said chamber to shift the liquid radially inwardly of the chamber upon increase in pressure;
(C) a second rotor extending into said chamber a sufficient distance to be subjected to liquid therein to be driven thereby;
(D) and a power take off from said rotor.

12. A clutch comprising, in combination:
(A) means including a first rotor adapted to be rotated by a source of power,
   (a) said means forming a first chamber, a second chamber and a third chamber in said rotor,
   (b) said rotor having a radially inwardly extending weir spaced laterally of the first mentioned chamber and forming a wall for the second chamber and a wall for the third chamber,
   (c) said rotor forming a passageway interconnecting the first and second chambers,
   (d) said means forming a duct connected with the first chamber and forming a duct connected with the second and third chambers,
   (e) a driving liquid in said chambers and passageway,
   (f) said ducts being connected, respectively, to independent sources of pressures for causing displacement of liquid between said chambers upon variation of differential of pressures in said ducts;
(B) a second rotor having:
   (g) a member extending into the first mentioned chamber a sufficient distance to be subjected to the liquid in said chamber,
   (h) and a pump having an intake extending into the liquid in the third mentioned chamber and having an outlet leading to the second mentioned chamber,
(C) and a third rotor freely rotatable with respect to both said first and second rotors,
   (i) the peripheral portion of said third rotor providing the separation between said first and second chambers.

13. A clutch comprising, in combination:
(A) means including a first rotor adapted to be rotated by a source of power,
   (a) said means forming a first chamber, a second chamber and a third chamber in said rotor,
   (b) said rotor having a radially inwardly extending weir spaced laterally of the first mentioned chamber and forming a wall for the second chamber and a wall for the third chamber,
   (c) said rotor forming a passageway interconnecting the first and second chambers,
   (d) said means forming a duct connected with the first chamber and forming a duct connected with the second and third chambers,
   (e) a driving liquid in said chambers and passageway,
   (f) said ducts being connected, respectively, to independent sources of pressures for causing displacement of liquid between said chambers upon variation of differential of pressures in said ducts;
(B) a second rotor having:
   (g) a first radially extending disc extending into said first chamber a sufficient distance to be subjected to the liquid in said chamber to be driven thereby,
   (h) a second radially extending disc mounted in spaced parallel arrangement to said first disc,
   (i) and a pump carried adjacent the periphery of said second disc and extending into the liquid in said third chamber and having an outlet to said second chamber.

14. A clutch comprising, in combination:
(A) means including a first rotor adapted to be rotated by a source of power,
   (a) said means forming a first chamber, a second chamber and a third chamber in said rotor,
   (b) said rotor having a radially inwardly extending weir spaced laterally of the first mentioned chamber and forming a wall for the second chamber and a wall for the third chamber, (c) said rotor forming a passageway interconnecting the first and second chambers, (d) said means forming a duct connected with the first chamber and forming a duct connected with the second and third chambers, (e) a driving liquid in said chambers and passageway, (f) said ducts being connected, respectively, to independent sources of pressures for causing displacement of liquid between said chambers upon variation of differential of pressures in said ducts;

(B) a second rotor having:

(g) a first radially extending disc extending into said first chamber a sufficient distance to be subjected to the liquid in said chamber to be driven thereby, (h) a second radially extending disc mounted in spaced parallel arrangement to said first disc, (i) and a pump carried adjacent the periphery of said second disc and extending into the liquid in said third chamber and having an outlet to said second chamber;

(C) and a third rotor in the form of a disc, (j) said third rotor being disposed between said first and second discs and being freely rotatable with respect to both said first and second rotors, (k) the peripheral portion of said third rotor providing a wall separating said first and second chambers.

References Cited by the Examiner

UNITED STATES PATENTS

| | | | |
|---|---|---|---|
| 773,240 | 10/04 | Whitcomb | 74—218 |
| 2,309,285 | 1/43 | Walton | 74—218 |
| 2,629,472 | 2/53 | Sterner | 192—58 |
| 2,902,127 | 9/59 | Hardy | 192—58 |

FOREIGN PATENTS 448,977  9/27  Germany.

DON A. WAITE, *Primary Examiner.*

FRANK SUSKO, DAVID J. WILLIAMOWSKY,
*Examiners.*